United States Patent [19]

Lawandy

[11] Patent Number: 5,028,109

[45] Date of Patent: Jul. 2, 1991

[54] METHODS FOR FABRICATING FREQUENCY DOUBLING POLYMERIC WAVEGUIDES HAVING OPTIMALLY EFFICIENT PERIODIC MODULATION ZONE AND POLYMERIC WAVEGUIDES FABRICATED THEREBY

[76] Inventor: Nabil M. Lawandy, 70 Ogden St., Providence, R.I. 02906

[21] Appl. No.: 470,835

[22] Filed: Jan. 26, 1990

[51] Int. Cl.[5] .................. G02B 6/10; G03C 1/52; H03F 7/00
[52] U.S. Cl. ................. 350/96.12; 350/96.13; 350/96.14; 350/96.34; 350/320; 430/170; 430/176; 307/427; 307/428; 307/430
[58] Field of Search .............. 350/96.10, 96.11, 96.12, 350/96.13, 96.14, 96.30, 96.34, 320, 311; 430/170, 176; 307/425, 426, 427, 428, 429, 430

[56] References Cited

U.S. PATENT DOCUMENTS

| | | | |
|---|---|---|---|
| 3,637,419 | 1/1972 | Lundsager | 118/409 |
| 3,661,614 | 5/1972 | Bassemir et al. | 117/38 |
| 3,831,038 | 8/1974 | Dabby | 350/96.12 X |
| 3,993,485 | 11/1976 | Chandross et al. | 350/96.34 X |
| 4,099,859 | 7/1978 | Merrill | 351/160 |
| 4,165,265 | 8/1979 | Nakabayashi et al. | 204/159.14 |
| 4,182,790 | 1/1980 | Schmidle | 428/260 |
| 4,187,265 | 2/1980 | Fischler | 264/22 |
| 4,191,622 | 3/1980 | Phillips et al. | 204/159.22 |
| 4,424,252 | 1/1984 | Nativi | 428/209 |
| 4,514,479 | 4/1985 | Ferrante | 430/2 |
| 4,531,809 | 7/1985 | Carter et al. | 350/96.19 |
| 4,707,059 | 11/1987 | Ogura et al. | 350/96.12 X |
| 4,734,143 | 3/1988 | Meoni | 156/102 |
| 4,792,208 | 12/1988 | Ulman et al. | 350/96.34 |
| 4,818,070 | 4/1989 | Gunjima et al. | 350/334 |
| 4,856,006 | 8/1989 | Yano et al. | 307/427 X |
| 4,865,406 | 9/1989 | Khanarian et al. | 350/96.12 |
| 4,867,510 | 9/1989 | Dobson | 307/427 |
| 4,896,931 | 1/1990 | Khurgin | 350/96.12 |
| 4,946,235 | 8/1990 | Scozzafava et al. | 350/96.34 |
| 4,971,416 | 11/1990 | Khanarian et al. | 350/96.12 |

OTHER PUBLICATIONS

"Self-organized Phase-matched Harmonic Generation in Optical Fibers", R. H. Stolen and H. W. K. Tom, Aug. 1987, vol. 12, No. 8 Optics Letters.
"Applications Requirements for Nonlinear-optical Devices and the Status of Organic Materials", G. T. Boyd, vol. 6, No. 4, Apr. 1989 J. Optical Soc. of Am. B.

Primary Examiner—Brian Healy
Attorney, Agent, or Firm—Perman & Green

[57] ABSTRACT

A method of fabricating a periodic nonlinear optic radiation modulation zone within a polymeric waveguide structure. The method includes the steps of (a) providing a layer of a polymeric material having an optically active material that is orientable by an electrical field; (b) applying an electrical field to the layer for orienting at least a portion of the optically active material; and (c) photopolymerizing at least a portion of the polymeric layer for fixing the oriented optically active material into the oriented position. In accordance with one embodiment the step of photopolymerizing includes the steps of (d) generating a diffraction pattern within the polymeric layer, the diffraction pattern being characterized by bright and dark fringes; and (e) photopolymerizing a volume of the polymeric layer within substantially only portions thereof that correspond to the bright fringes. In accordance with another embodiment the step of applying includes a step of generating a periodic DC field potential within the polymeric layer by a third order effect induced by passing radiation having a wavelength of lambda and a wavelength of 2(lambda) through the polymeric layer.

30 Claims, 2 Drawing Sheets

METHODS FOR FABRICATING FREQUENCY DOUBLING POLYMERIC WAVEGUIDES HAVING OPTIMALLY EFFICIENT PERIODIC MODULATION ZONE AND POLYMERIC WAVEGUIDES FABRICATED THEREBY

FIELD OF THE INVENTION

This invention relates generally to nonlinear optical devices and, in particular, relates to methods for fabricating frequency doubling polymeric waveguides and other thin film polymer-based devices having a region characterized by a regularly repeating, optical modulation structure. The invention also encompasses devices fabricated either wholly or in part by the methods disclosed herein.

BACKGROUND OF THE INVENTION

An approach to performing Second Harmonic Generation (SHG) with low-power lasers is to confine the fundamental power over long distances in an optical waveguide. A problem of producing a high-quality optical waveguide of sufficient nonlinearity for SHG or parametric amplification in principle may be overcome with poled polymers. As discussed by G.T. Boyd in journal article "Applications requirements for nonlinear-optical devices and the status of organic materials", J. Opt. Soc. Am. B, Vol. 6, No. 4, 4/89 a major application of such a SHG poled polymer is frequency doubling of laser diodes from approximately 800 to 400 nm, thereby improving data storage packing densities and data capture rates.

As described by Boyd the expression for the output power is essentially identical to that for single crystal SHG, except for a factor, S, referred to as the overlap integral:

$$S \propto \left[ \int_{-\infty}^{\infty} E_m^2(\omega,y,z) E_m(2\omega,y,z) dy dz \right]^2, \quad (1)$$

where $E_m(\omega,z)$ is the waveguide field of frequency $\omega$ and mode m, and where y and z are the spatial dimensions in the plane perpendicular to the propagation direction. One technique to phase match SHG in the waveguide is to use different modes (m and m') for the fundamental and the second harmonic such that effective waveguide index $n_m(\omega) = n_{m'}(2\omega)$. However, if the fundamental and the second harmonic are confined to the same guiding channel, the two different modes generally have a small overlap integral. As an example, a phase-matched conversion from $TE_0(\omega)$ to $TE_2(2\omega)$ gives a value for S of approximately 0.2%. For an input power of mW at 810 nm, and waveguide dimensions of 0.5 $m^2 \times 1$ cm, one finds that a second order nonlinear susceptability $\chi^{(2)} \geq 3 \times 10^{-8}$ esu is required for a 1—mW output. However, if perfect phase matching and mode overlap can be achieved, the necessary nonlinearity is reduced to $\chi^{(2)} \geq 2 \times 10^{-9}$ esu.

In U.S. Pat. No. 4,865,406, issued Sept. 12, 1989 entitled "Frequency Doubling Polymeric Waveguide", G. Khanarian and D.R. Haas describe SHG with a polymeric waveguide having a periodic structure for quasi-phase matching of propagating laser energy. Poling of the thin film polymeric waveguide medium is achieved by heating the medium near or above its melting point or glass transition temperature, by example 90° C., and applying a DC electric field of 50–150 V/micron to align molecular dipoles in a uniaxial direction. The medium is subsequently cooled with the field still applied to immobilize the aligned molecules within poled domains. Upper and lower poling electrodes are required, at least one of the electrodes having a grating configuration.

FIG. 1 illustrates a thin film waveguide similar to that illustrated in U.S. Pat. No. 4,865,406 wherein a substrate supports a nonlinear optically active polymer film having a periodic nonlinear optical modulation zone. A portion of input laser radiation of wavelength lambda is frequency doubled to provide output radiation of wavelength lambda/2. Prisms are employed to couple the radiation into and out of the waveguide.

One perceived problem with this teaching of Khanarian et al. relates to the relatively high temperature processing step required to raise the polymer above its melting point or glass transition temperature. As a result of the significant thermal energy present in the polymer a significantly larger magnitude DC potential is required to align and maintain in alignment the molecules than would be required if this processing step were accomplished at, for example, room temperature. Also, the use of a large magnitude DC electric field presents a danger of arc-over and degradation or destruction of the polymer film and in any event places a lower limit on the thickness of the waveguide structure. Furthermore, high temperature processing may be inconsistent with other materials if the waveguide forms a part of a composite structure.

Another perceived problem with this teaching is the requisite fabrication of the small geometry grating electrode structures for generating a periodic electric field for forming the corresponding poled domains. The grating electrode fabrication steps entail several processing steps including photolithographic and etching processes such as those employed for the fabrication of integrated circuits. As a result, processing complexity is increased and device cost is adversely impacted.

A still further perceived problem with this teaching relates to a resultant nonoptimum shape or geometry of the poled domains within the periodic modulation zone. It can be shown that a sine function represents an optimum cross-sectional domain shape to reduce or eliminate wasted Fourier energy and energy losses at other spatial frequencies. However, it is believed that the grating electrodes of Khanarian et al. will not impart such an optimum shape to the poled domains and as a result the waveguide of Khanarian et al. experiences energy inefficiencies.

In U.S. Pat. No. 4,818,070, Apr. 4, 1989, entitled "Liquid Crystal Optical Device Using U.V.-Cured Polymer Dispersions and Process for its Production" Gunjima et al. disclose a liquid crystal device cured with ultraviolet (UV) radiation. A voltage is applied during curing to optically orient at least a portion of the liquid crystal material. This disclosure of Gunjima et al is limited the modification of a refractive index of a portion of a liquid crystal material and does not extend to optical waveguides for SHG.

In U.S. Pat. No. 4,187,265, Feb. 5, 1980, entitled "Method of Making Ornamental Plastic Product" by D. Fischler there is disclosed a resinous mass containing lamella that is exposed to an orienting influence, such as contact with a roller, before curing The mass is said to preferably be cooled prior to orientation and irradiation with an electron beam in order to increase the viscosity of the mass. Increased viscosity is said to permit more efficient and complete orientation with the application of less orientating forces and to reduce a tendency toward disorientation (col. 8, lines 48-63).

U.S. Patents of general interest include the following. U.S. Pat. No. 4,182,790, Jan. 8, 1980, entitled "Liquid Alkylacrylamides and Related Compositions" by Schmidle discloses radiation curable compositions. U.S. Pat. No. 4,191,622, Mar. 4, 1980, entitled "Apparatus and Method for Producing Stereo-Regular Polymers" by Phillips et al. teaches the production on an electric field across a light-activated monomer in order to orient the monomer. U.S. Pat. No. 4,424,252, Jan. 3, 1984, entitled "Conformal Coating Systems" by L. Nativi discloses a UV curable conformal coating system and U.S. Pat. No. 4,734,143, Mar. 29, 1988, entitled "Process for the Production of a Continuous Composite Ribbon Including an Acrylate Resin Film to be used in Safety Laminated Glass Panels" by M. Meoni discloses the production of safety glass by a two step irradiation of a polymerizable mixture.

Other U.S. Patents of general interest dealing with aspects of curable compositions include the following: U.S. Pat. No. 3,637,419, Jan. 25, 1972 entitled "Method of Coating Rigid Cores and Product Thereof" by C. Lundsager, U.S. Pat. No. 3,661,614, May 9, 1972, entitled "Radiation-Curable Ink Compositions" by Bassemir et al., U.S. Pat. No. 4,165,265, Aug. 21, 1979, entitled "Multi-Stage Irradiation Method of Curing a Photocurable Coating Composition" by Nakabayashi et al. and U.S. Pat. No. 4,099,859, July 11, 1978, entitled "Contact Lens Having a Smooth Surface Layer of Hydrophilic Polymer" by E. Merrill.

However, none of these U.S. Patents disclose methods or apparatus suitable for fabricating an optical waveguide structure that overcomes the foregoing problems and which realizes other advantages and efficiencies.

It is thus an object of the invention to provide methods for fabricating a structure having a region characterized by regularly repeating, optically modulating domains, the methods not requiring a high temperature processing step.

It is another object of the invention to provide methods for fabricating a frequency doubling polymeric waveguide structure that does not require a high temperature processing step.

It is a further object of the invention to provide methods for fabricating a frequency doubling polymeric waveguide structure accomplished without a requirement of first fabricating a periodic electrode structure.

It is one further object of the invention to provide methods for fabricating a frequency doubling polymeric waveguide structure having poled domains of optimum shape for minimizing optical losses.

It is a still further object of the invention to provide methods for fabricating a thin film polymeric structure having a region characterized by regularly repeating domains containing noncentrosymetric dye molecules poled into a desired orientation and fixed in position by photopolymerization.

It is one further object of the invention to provide optically active devices constructed in accordance with the foregoing objects of the invention.

SUMMARY OF THE INVENTION

The above set forth and other problems are overcome and the objects of the invention are realized by a method of fabricating a periodic nonlinear optic radiation modulation zone within a polymeric waveguide structure. The method includes the steps of (a) providing a layer of a polymeric material having an optically active material that is orientable by an electrical field; (b) applying an electrical field to the layer for orienting at least a portion of the optically active material; and (c) photopolymerizing at least a portion of the polymeric layer for fixing the oriented optically active material into the oriented position.

In accordance with one embodiment of the invention the step of photopolymerizing includes the steps of (d) generating a periodic spatial pattern within the polymeric layer using interfering optical beams, the periodic spatial pattern being characterized by bright and dark fringes; and (e) photopolymerizing a volume of the polymeric layer within substantially only portions thereof that correspond to the bright fringes.

In accordance with another embodiment of the invention the step of applying includes a step of generating a periodic DC field potential within the polymeric layer by a third order nonlinear effect induced by passing radiation having a frequency of $\omega$ and a frequency of $2\omega$ through the polymeric layer.

The invention provides for the repetitive domains or regions to have an optimum cross-sectional profile that is to a high accuracy that of a sine function. This optimal profile advantageously eliminates abrupt transitions and results in a minimal loss of Fourier and other energy from the laser radiation passing through the waveguide.

The invention also provides an optical waveguide having a periodic nonlinear optic modulation zone for frequency doubling diode laser radiation having a wavelength within a range of approximately 700 to 1300 nanometers. The zone is formed within a layer comprised of a polymeric material and is characterized by an alternating sequence of domains wherein in a first domain an optically active material has a first orientation and in an adjacent domain the optically active material has a second orientation that is substantially opposite to the first orientation. The domains are characterized by having a cross-sectional shape selected to minimize losses to the laser radiation passing therethrough. Preferably the selected shape approximates a sinusoidal function. In one embodiment the polymeric material is comprised of a photopolymer and and the optically active material is comprised of a nonlinear moiety associated with the photopolymer. In another embodiment the polymeric material is comprised of a photopolymer and the optically active material is comprised of a quantity of polar dye molecules with large, possibly resonantly enhanced second order molecular polarizability ($\beta$).

BRIEF DESCRIPTION OF THE DRAWING

These and other features of the invention are made more apparent in the ensuing Detailed Description of the Invention when read in conjunction with the attached Drawing, wherein:

FIG. 3b shows a second step of the method of FIG. 3a;

DETAILED DESCRIPTION OF PREFERRED EMBODIMENTS OF THE INVENTION

Figure 2:
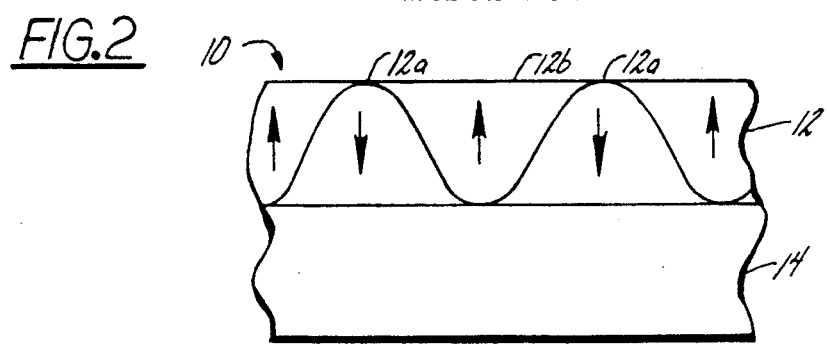
FIG. 2 depicts in cross-section a portion of a waveguide periodic modulation zone having an optimum geometry for minimizing wasted Fourier energy.

FIG. 2 illustrates a portion of an optical waveguide 10, specifically a nonlinear optic modulation zone having a regularly repeating structure formed within a polymeric layer 12 and comprised of a plurality of oppositely aligned domains 12a and 12b. Polymeric layer 12 is disposed upon an underlying supporting substrate comprised of, by example, glass, silicon or any suitable material. The polymeric layer 12 is coated or spun onto the substrate in a conventional manner to a typical thickness of from approximately 1.5 microns to some several tens of microns. Polymeric layer 12 is preferably comprised of an acrylic resin having the properties of being substantially transparent to optical wavelengths of interest and further being cured or cross-linked with optical or electonic energy of reasonable magnitudes. UV radiation curable acrylic resins such as PMMA or MMA are suitable as well as epoxy based systems. In one embodiment of the invention the curable polymeric medium has orientable (polar) side chains which lack inversion symmetry and which further have an intrinsic nonlinear optical response. By example, the medium is comprised of a dicyanovinyl azo methacrylate polymer having a structure as shown below:

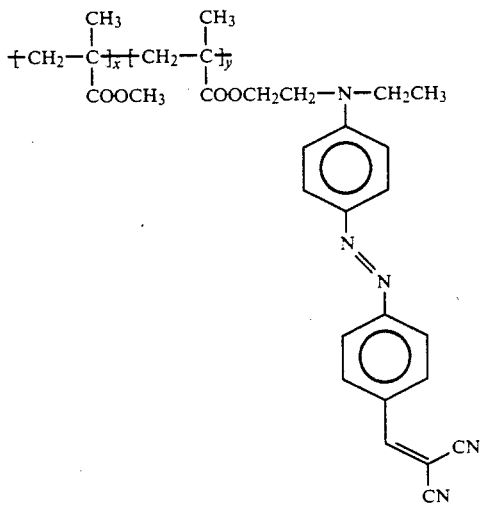

In another embodiment of the invention the polymeric medium contains a quantity of a centrosymmetric polar material such as a dye which may or may not be chemically bonded to the polymer chains. Examples of suitable dyes include DANS and Merocyanine, the particular dye being selected for an emission characteristic at the desired doubled frequency value. That is, the polymeric layer 12 is comprised of a polymer including an optically active agent that is orientable by a DC field, the optically active agent being a dye or a polymer having a nonlinear moiety already included. By example, the polymeric layer 12 is comprised of a $10^{-2}$ M solution of Merocyanine, an azo dye, DANS, disperse red, p-nitroanaline or other donor-acceptor systems. The polymer is preferably spun-on to a thickness that controls the number of modes that are guided by the waveguide By example, a thickness of approximately three microns or less is provided upon a suitable substrate 14, such as a substrate comprised of glass.

As can be seen in FIG. 2 the domains or regions 12a and 12b have a cross-sectional profile that is approximately that of a sine function. This optimal profile advantageously eliminates abrupt transitions and results in a minimal loss of Fourier energy. Methods of achieving this optimal profile are now disclosed.

Figure 3A:
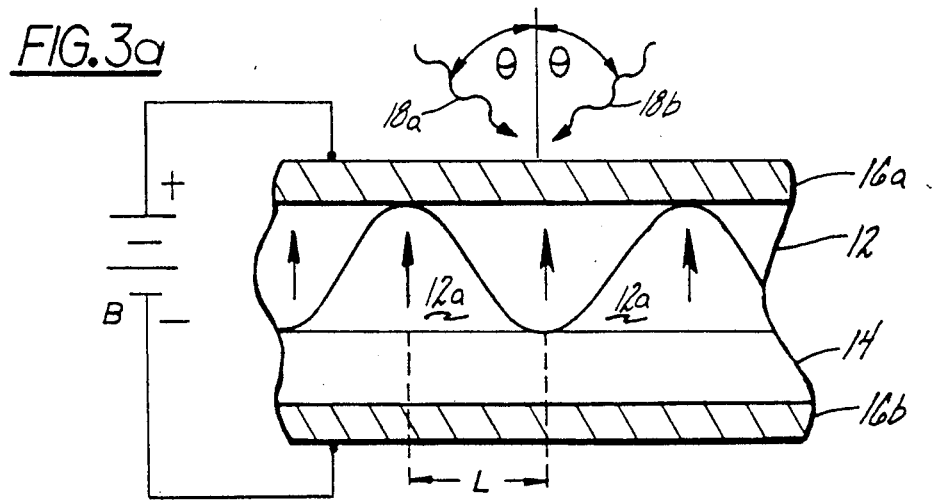
FIG. 3a shows a first step of one embodiment of a method for fabricating the periodic modulation zone having the shape depicted in FIG. 2, this method employing a diffraction pattern formed by two incident wavefronts of polymerizing radiation.
Figure 3B:
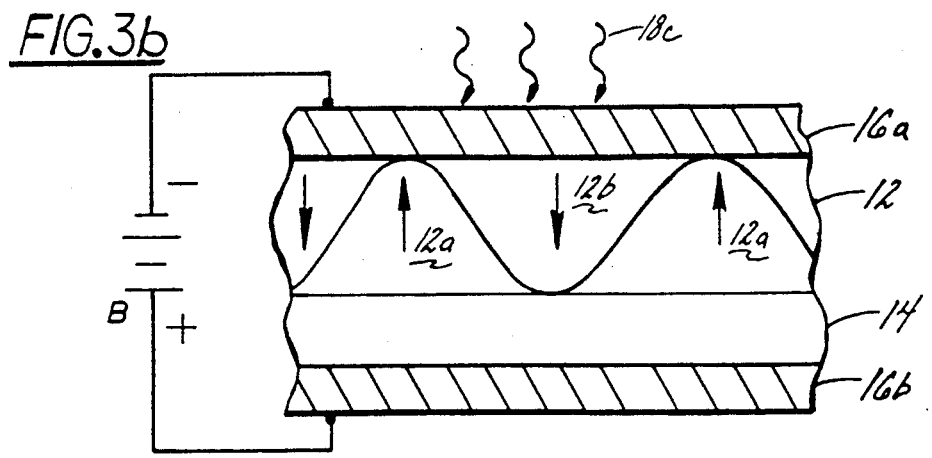

FIGS. 3a and 3b illustrate steps of a first method of the invention. The substrate 14 having an overlying polymeric layer 12 is provided with a top electrode 16a and a bottom electrode 16b. At least the top electrode 16a is comprised of a material substantially transparent to radiation supplied for optically curing the polymeric layer 12. For example, at least the electrode 16a is comprised of TiO. A source of poling bias, shown as a battery (B), is electrically coupled to the electrodes 16a and 16b for providing a first DC field having a first polarity. This initial field uniformly aligns the nonlinear polymeric material and/or the polar dye molecules in a manner shown in FIG. 3a. The alignment angle (theta) measured relative to the applied field can be shown to be:

$$\cos \theta = (\mu E)/3kT, \qquad (2)$$

where E is the electric field potential, k is Boltzmann's constant and T is the temperature of the polymeric material. As can be seen, the lower the temperature the more closely does the molecular alignment approach the desired alignment of 90° with respect to the optical axis though the periodic region. The DC field strength is typically in a range of $5 \times 10^6$ to $50 \times 10^6$ Volts/meter.

After applying the field the field is maintained for some period of time, typically many rotational diffusion periods, to ensure a maximally aligned condition. Next, the polymeric layer 12 is illuminated with radiation having a wavelength suitable for polymerizing the medium, thereby preserving the alignment after the field is removed. In accordance with this aspect of the invention the polymerizing radiation is UV radiation having a wavelength of approximately 360 nanometers provided as two wavefronts in such a manner that interference fringes are produced within the polymeric layer 12. As a result, in those areas characterized by interference and mutual destruction of radiation the polymerization reaction in minimal, while in those areas of mutual reinforcement of radiation the material is polymerized and the orientation of the material preserved in the manner shown. The typical cross-linking depth into the polymeric material is approximately 10 to 50 microns, but only some fraction of this depth need be employed depending on the desired thickness of the polymeric layer 12. By example the UV radiation may be provided by a 365 nanometer Ar laser or by a 360 nanometer HeCd laser. Although two separate sources can be employed preferably a beam from a single source is split in a conventional manner to provide a first beam 18a and a second beam 18b each provided at an angle theta given by:

$$\sin \theta = \theta/2L, \quad (3)$$

where lambda is the wavelength of the polymerizing radiation and L is the distance between interference fringes. The value of L thus defines the period of the periodic modulating structure. In that a mask is not employed there is no sharp transition between domains and the domain shape approximates that of the optimal shape shown in FIG. 2. Typically the thickness of the layer 12 and the intensity and wavelength of the polymerization radiation are selected as a function of the polymerization characteristics of the material of layer 12 in order to optimize the shape profile of the domains 12a and 12b.

L is given by:

$$L = \frac{\lambda 0}{(n(2\omega) - n(\omega))}. \quad (4)$$

For typical glassy media-like polymers L has a value of approximately five microns to approximately 100 microns.

After selectively polymerizing the regions indicated as 12a the polarity of the source B is reversed, thereby reversing the orientation of the polymeric material 12 only in the unpolymerized regions 12b. After some interval of time a substantially uniform illumination of the polymeric layer 12 is accomplished with the UV radiation 18c. This second irradiation polymerizes the remaining material in the regions 12b and the waveguide structure is completed.

As can be appreciated this first method of the invention can be accomplished at a relatively low temperature such as at room temperature. If desired the polymeric material can be cooled below room temperature to even further optimize the alignment angle as shown in equation (2) above. In general, in that the polymerization of the polymeric material 12 is accomplished optically the procedure can be accomplished at any temperature that is suitable for the selected photopolymer.

Figure 4:
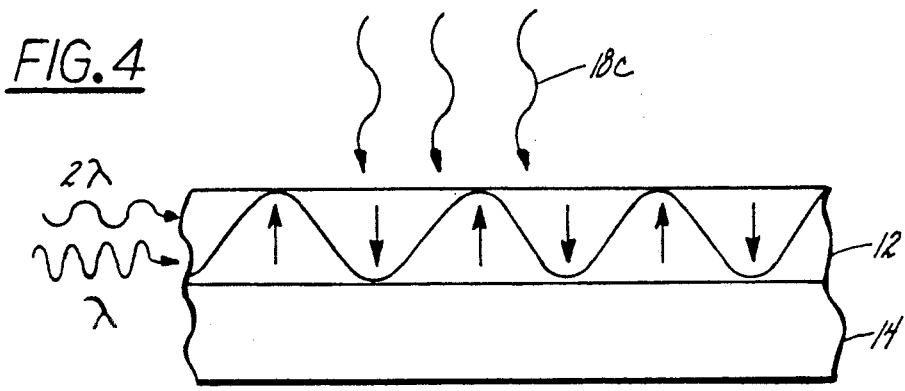
FIG. 4 illustrates another embodiment of a method for fabricating the periodic modulation zone having the shape depicted in FIG. 2, this method generating a repetitive DC poling field with a repetitive DC field that is induced in the polymer by application of radiation of frequency $\omega$ and $2\omega$.

Referring now to FIG. 4 there is illustrated a second method of fabricating the periodic nonlinear optical modulation zone of the polymeric waveguide 10. This second method of the invention is also an inherently low temperature process that generates a periodic electric poling field of optimum shape within the polymeric medium, although in this case without a required fabrication of poling electrodes.

In a journal article entitled "Self-Organized Phase-Matched Harmonic Generation in Optical Fibers" August 1987, Vol. 12, No. 8, Optics Letters R. H. Stolen et al. disclose the generation of second-harmonic light from a single-mode optical fiber after a few minutes of seeding the fiber with 532 nm harmonic light in addition to 1064 nm light. That is, a mechanism is described as a possible mechanism for photoinducing an alternating second-order nonlinearity in the fiber. The production of a DC polarization ($P_{dc}$) by a third order nonlinear process is described. After an interval of writing the silica fiber is found to have a permanently written array of dipoles and functions as a second harmonic generator when illuminated with light having a wavelength of 1064 nm.

The invention exploits this generation of a periodic DC field to periodically align the dipoles of the polymeric medium. The generated field potential ($E_{DC}$) can be shown to be approximately equal to:

$$E_{DC} = \chi^{(3)} E^2(\omega) E(2\omega), \quad (5)$$

where $\chi^{(3)}$ is the third order nonlinear susceptability. A typical value is $10^5$ V/m to $10^6$ V/m depending on the $\chi^{(3)}$ of the polymer Typical values of $\chi^{(3)}$ for a polymeric glassy system are $10-19$ m²/V² to $10^{-21}$m²/V².

Figure 1:
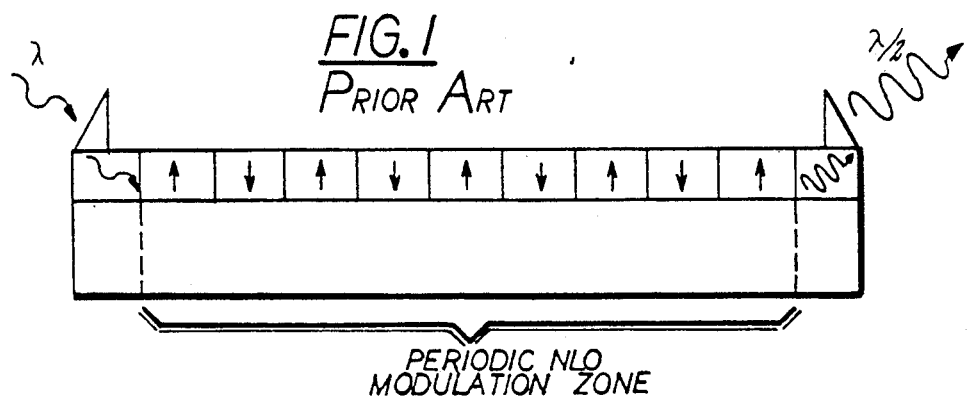
FIG. 1 depicts in cross-section a polymeric thin film optical waveguide of the prior art.

In FIG. 4 radiation of lambda and 2(lambda) is passed through the polymeric layer 12. By example lambda is 532 nm and 2(lambda) is 1064 nm. The radiation at lambda and 2(lambda) can be injected into the layer 12 by the use of an input prism as depicted in FIG. 1. The periodic modulation of the DC field potential induced by the radiation causes a corresponding periodic reversal of the local alignment of the dipoles of the polymeric medium As a result, the plurality of alternately aligned domains are generated simultaneously. After a period of, typically, several hours the polymeric layer 12 is uniformly illuminated with UV radiation 18c. Exposure to radiation 18c polymerizes the layer 12, thereby permanently locking the domains 12a and 12b into the structure. Thereafter when radiation of 1064 nm is injected into the layer 12 some percentage is converted to the second harmonic at 512 nm, which is the desired result.

It should be noted that this embodiment of the invention can be carried out with other than photopolymeric material. For example, a polymeric material is heated to above its melting point or glass transition temperature, the periodic DC field is induced by the third order effect of passing radiation of lambda and 2(lambda) through the melted polymer, the domains are aligned by the periodic field and the polymer is cooled to lock the domains in place.

Figure 5:
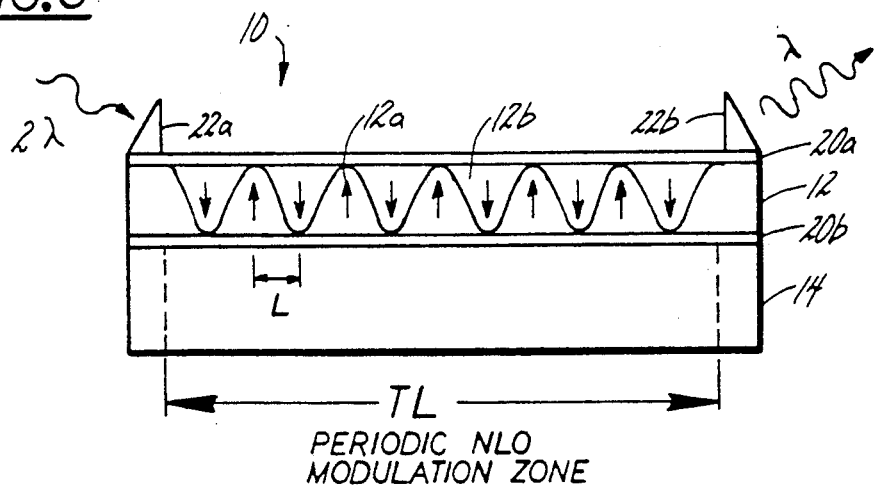
FIG. 5 illustrates a SHG waveguide having prisms for coupling radiation into and out of the waveguide.

FIG. 5 illustrates one embodiment of the SHG waveguide 10 of the invention. Polymeric layer 12 having domains 12a and 12b is disposed upon a substrate 14. Layers 20a and 20b represent cladding layers which may be fabricated as described in the U.S. Pat. No. 4,865,406. For the embodiment of FIG. 3a and 3b above the layer 20a may also include the upper electrode 16a. An input prism 22a and an output prism 22b are employed to couple in radiation of wavelength 2(lambda), for example 1064 nm, and to couple out radiation of wavelength lambda, or 532 nm, and 2(lambda), respectively. The periodic nonlinear optic modulation zone has the domains 12a and 12b of the preferred cross-sectional shape for minimizing radiation losses. As an example, the NLO modulation zone has a total length (TL) of approximately one centimeter and contains approximately $10^2$ to $10^3$ of the domains 12a and 12b, each of the domains having a linear dimension or length L of approximately 50 microns.

Figure 6:
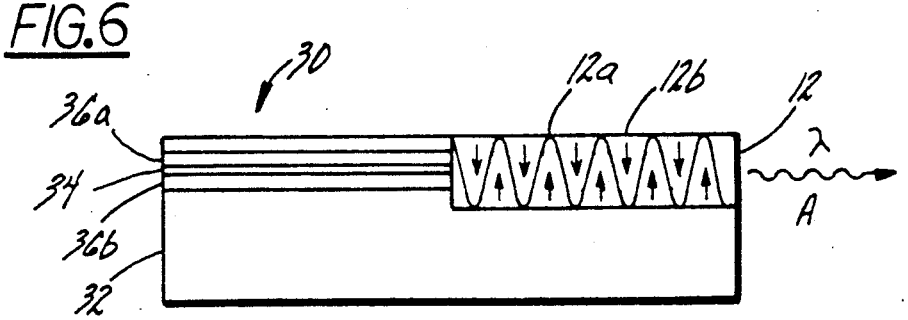
FIG. 6 illustrates a SHG waveguide of the invention integrally fabricated with and edge fired by a laser stripe diode.

FIG. 6 illustrates a further embodiment of the invention wherein the polymeric layer 12 having the optimally shaped domains 12a and 12b of the invention is fabricated as part of a laser diode. For example, a laser diode 30 includes a substrate 32, such as a substrate comprised of Group III-V material. A single quantum well (SQW) or multi-quantum well (MQW) active laser stripe 34 is disposed between an upper cladding layer 36a and a lower cladding layer 36b. The structure is end cleaved and the SHG waveguide of the invention is fabricated, in accordance with one of the methods of the invention, directly upon a portion of the laser substrate 32. During operation the laser 30 generates radiation at a nominal wavelength of, for example, 830 nm. The laser radiation is edge coupled directly into the SHG waveguide where the laser radiation is frequency doubled to form an output radiation beam A of 415 nm.

While the invention has been particularly shown and described with respect to presently preferred embodiments thereof, it will be understood by those skilled in the art that changes in form and details may be made therein without departing from the scope and spirit of the invention.

What is claimed is:

1. A method of fabricating a polymeric structure having a region characterized by a repetitive sequence of regions, each region having molecular structures aligned in a direction that is opposite an alignment of molecular structures in an adjacent one of the regions, comprising the steps of:

providing a layer comprised of a polymeric material having the molecular structures contained within;

applying an orientating influence to the polymeric layer to align substantially all of the molecular structures in a first direction;

generating a diffraction pattern within the polymeric layer, the diffraction pattern being characterized by bright and dark fringes;

polymerizing a volume of the polymeric layer within substantially only portions thereof that correspond to the bright fringes, the step of polymerizing including a step of fixing the alignment of the molecular structures within the polymerized portions in the first direction;

applying an orientating influence to the polymeric layer to align substantially all of the unfixed molecular structures in a second direction; and polymerizing the remaining portions of the polymeric layer to fix the molecular structures therein with an alignment in the second direction.

2. A method as set forth in claim 1 wherein the step of generating includes a step of illuminating the polymeric layer with two wavefronts of radiation, the two wavefronts having a wavelength selected for photopolymerizing the polymeric layer.

3. A method as set forth in claim wherein the first step of applying an orientating influence is accomplished by applying a DC electrical field potential across the polymeric layer and wherein the second step of applying an orientating influence includes a step of reversing the polarity of the DC electric field potential.

4. A method as set forth in claim 3 wherein the DC electric field potential has a magnitude within a range of approximately $5 \times 10^6$ to approximately $50 \times 10^6$ Volts/meter.

5. A method as set forth in claim 1 wherein the step of providing provides a layer comprised of a photopolymer having a nonlinear moiety included therein.

6. A method as set forth in claim 1 wherein the step of providing provides a layer comprised of a photopolymer and a selected dye.

7. A method of fabricating a polymeric structure having a region characterized by a repetitive sequence of regions, each region having molecular structures aligned in a direction that is opposite an alignment of molecular structures in an adjacent one of the regions, comprising the steps of:

providing a layer comprised of a polymeric material having the molecular structures contained within;

applying an orientating influence to the polymeric layer to align a plurality of first portions of the molecular structures in a first direction and to align a plurality of second portions of the molecular structures in a second direction that is substantially opposite the first direction such that individual ones of the first portions are interposed between two of the second portions in a repetitive sequence; and photopolymerizing the polymeric layer to fix the alignment of the first and the second portions of the molecular structures.

8. A method as set forth in claim 7 wherein the step of providing provides a layer comprised of a photopolymer having a nonlinear moiety included therein.

9. A method as set forth in claim 7 wherein the step of providing provides a layer comprised of a photopolymer and a selected dye.

10. A method as set forth in claim 7 wherein the step of applying includes a step of generating a periodic DC field potential within the polymeric layer.

11. A method as set forth in claim 10 wherein the periodic DC field potential is generated by passing radiation having a frequency of omega and a frequency of twice omega through the polymeric layer.

12. A method of fabricating a periodic nonlinear optic radiation modulation zone within a polymeric waveguide structure, comprising the steps of:

providing a layer of a polymeric material having an optically active material that is orientable by an electrical field;

applying an electrical field to the layer for orienting at least a portion of the optically active material; and photopolymerizing at least a portion of the polymeric layer for fixing the oriented optically active material into the oriented position.

13. A method as set forth in claim 12 wherein the step of photopolymerizing includes the steps of:

generating a diffraction pattern within the polymeric layer, the diffraction pattern being characterized by bright and dark fringes; and photopolymerizing a volume of the polymeric layer within substantially only portions thereof that correspond to the bright fringes.

14. A method as set forth in claim 12 wherein the step of applying includes a step of generating a periodic DC field potential within the polymeric layer by a third order nonlinear effect induced by passing radiation having a frequency of omega and a frequency of twice omega through the polymeric layer.

15. A method as set forth in claim 12 wherein the step of providing provides a layer comprised of a photopolymer and wherein the optically active material is comprised of a nonlinear moiety associated with the photopolymer.

16. A method as set forth in claim 12 wherein the step of providing provides a layer comprised of a photopolymer and wherein the optically active material is comprised of polar dye molecules.

17. A method as set forth in claim 12 wherein the steps of applying and photopolymerizing are accomplished at a temperature substantially equal to or less than room temperature.

18. An optical waveguide having a periodic nonlinear optic modulation zone for frequency doubling at least a portion of laser radiation passing therethrough, the zone being formed within a layer of a polymeric material and being characterized by an alternating sequence of domains wherein in a first domain an optically active material has a first orientation and in an adjacent domain the optically active material has a second orientation that is substantially opposite to the first orientation, the domains being characterized by having a cross-sectional shape that is approximately sinusoidal for minimizing a loss of Fourier energy of laser radiation passing therethrough, wherein the polymeric material is comprised of a photopolymer and wherein the optically active material is comprised of a nonlinear moiety dissolved within or chemically attached to the photopolymer.

19. An optical waveguide as set forth in claim 18 wherein the polymeric material is comprised of a photopolymer and wherein the optically active material is comprised of a quantity of polar dye molecules.

20. An optical waveguide as set forth in claim 18 wherein the laser radiation has a wavelength within a range of approximately 700 to 1300 nanometers.

21. An optical waveguide as set forth in claim 18 wherein the laser radiation is generated by a diode laser and has a wavelength within a range of approximately 700 to 1300 nanometers, and wherein the waveguide is optically coupled to the laser diode for having the laser radiation directly injected therein from an output of the laser diode.

22. An optical waveguide as set forth in claim 21 wherein the waveguide is fabricated on a common substrate with the laser diode.

23. An optical waveguide as set forth in claim 18 and including an input coupling means and an output coupling means for coupling by internal reflection laser radiation into the waveguide and for coupling by internal reflection frequency doubled radiation out of the waveguide, respectively.

24. An optical waveguide as set forth in claim 23 wherein the input coupling means and the output coupling means are each comprised of a prism.

25. A method of fabricating a periodic nonlinear optic radiation modulation zone within a polymeric structure, comprising the steps of:
providing a layer comprised of a polymeric material having an optically active material that is orientable by an electrical field;
applying an electrical field to the layer for orienting at least a portion of the optically active material, the step of applying including a step of generating a periodic DC field potential within the polymeric layer by a third order nonlinear effect; and
polymerizing the polymeric layer for fixing the oriented optically active material.

26. A method as set forth in claim 25 wherein the step of generating includes a step of passing radiation having a wavelength of lambda and a wavelength of twice lambda through the polymeric layer.

27. A method as set forth in claim 25 wherein the step of polymerizing includes a step of photopolymerizing the polymeric layer.

28. A method as set forth in claim 25 wherein the step of polymerizing includes a step of cooling the polymeric material to a temperature that is less than a melting point temperature or a glass transition temperature of the polymeric material.

29. An optical waveguide as set forth in claim 18 wherein the photopolymer includes polar side chains that lack inversion symmetry and which have an intrinsic nonlinear optical response.

30. An optical waveguide as set forth in claim 18 wherein each of the domains has a length, along a path of the laser radiation, within a range of approximately five microns to approximately 100 microns.

* * * * *